United States Patent
Sutariya et al.

(10) Patent No.: US 9,665,556 B1
(45) Date of Patent: May 30, 2017

(54) ASSIGNING SLOTS TO USER INTERFACE ELEMENTS

(75) Inventors: Mehul G. Sutariya, Seattle, WA (US); Adam Lloyd Days, Tacoma, WA (US); Yashar D. Fakhari, Lynnwood, WA (US); Adam Brent Johnson, Seattle, WA (US); Margaret E. McCanner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 675 days.

(21) Appl. No.: 13/555,388

(22) Filed: Jul. 23, 2012

(51) Int. Cl.
*G06F 17/00* (2006.01)
*G06F 17/24* (2006.01)
*G06F 17/21* (2006.01)
*G06F 17/30* (2006.01)

(52) U.S. Cl.
CPC .......... *G06F 17/248* (2013.01); *G06F 17/212* (2013.01); *G06F 17/3089* (2013.01)

(58) Field of Classification Search
CPC .. G06F 17/248; G06F 17/212; G06F 17/3089; G06F 3/0481; G06F 17/30905
See application file for complete search history.

(56) References Cited

U.S. PATENT DOCUMENTS

| | | |
|---|---|---|
| 5,446,891 A | 8/1995 | Kaplan et al. |
| 5,749,081 A | 5/1998 | Whiteis |
| 5,774,123 A | 6/1998 | Matson |
| 5,825,651 A | 10/1998 | Gupta et al. |
| 5,848,396 A | 12/1998 | Gerace |
| 5,870,559 A | 2/1999 | Leshem et al. |
| 5,958,008 A | 9/1999 | Pogrebisky et al. |
| 6,012,051 A | 1/2000 | Sammon et al. |
| 6,606,102 B1 * | 8/2003 | Odom .......................... 715/745 |
| 6,636,836 B1 | 10/2003 | Pyo |
| 6,714,975 B1 * | 3/2004 | Aggarwal et al. ........... 709/224 |
| 6,735,572 B2 | 5/2004 | Landesmann |
| 7,016,864 B1 | 3/2006 | Notz et al. |
| 7,295,995 B1 * | 11/2007 | York ..................... G06Q 30/02 705/26.8 |
| 7,720,723 B2 * | 5/2010 | Dicker et al. ................ 705/26.8 |
| 8,122,016 B1 * | 2/2012 | Lamba et al. ................ 707/723 |
| 8,170,913 B1 * | 5/2012 | Baluja ........................ 705/14.43 |
| 8,219,447 B1 | 7/2012 | Ieong et al. |
| 8,229,915 B1 * | 7/2012 | Lloyd et al. .................. 707/709 |

(Continued)

OTHER PUBLICATIONS

U.S. Appl. No. 11/758,932, filed Jun. 6, 2007 and entitled "Real-time Adaptive Probabilistic Selection of Messages."

(Continued)

*Primary Examiner* — Kyle Stork
*Assistant Examiner* — Barbara Level
(74) *Attorney, Agent, or Firm* — Thomas | Horstemeyer, LLP

(57) ABSTRACT

Disclosed are various embodiments for assigning user interface widgets to page slots associated with a page template. In response to a request to generate a content page, content placement requests are then received from user interface widgets. The page slots are associated with a placement value indicating a value of the page slot relative to other page slots in the page template. The highest ranked user interface widgets according to an effectiveness metric or placement score are scheduled for placement in the content page.

25 Claims, 9 Drawing Sheets

(56) References Cited

U.S. PATENT DOCUMENTS

| | | | |
|---|---|---|---|
| 8,271,328 B1* | 9/2012 | Baltz et al. | 705/14.4 |
| 8,301,623 B2 | 10/2012 | Chakrabarti et al. | |
| 8,311,875 B1* | 11/2012 | Lloyd | 705/7.29 |
| 8,315,849 B1* | 11/2012 | Gattani et al. | 704/2 |
| 8,412,665 B2 | 4/2013 | Wang et al. | |
| 8,561,081 B1* | 10/2013 | Richards et al. | 719/313 |
| 8,566,178 B1 | 10/2013 | Robinson et al. | |
| 8,572,011 B1* | 10/2013 | Sculley, II | 706/13 |
| 8,725,739 B2* | 5/2014 | Liang et al. | 707/740 |
| 8,949,712 B1* | 2/2015 | Days et al. | 715/243 |
| 2005/0193334 A1* | 9/2005 | Ohashi et al. | 715/517 |
| 2006/0107204 A1* | 5/2006 | Epstein | 715/517 |
| 2007/0209013 A1* | 9/2007 | Ramsey et al. | 715/769 |
| 2008/0010590 A1* | 1/2008 | Curtis | G06F 17/30905 715/246 |
| 2008/0120316 A1* | 5/2008 | Vion-Dury | G06F 17/2247 |
| 2008/0154684 A1* | 6/2008 | Kniaz et al. | 705/8 |
| 2009/0198581 A1* | 8/2009 | Lidestri | 705/14 |
| 2010/0255882 A1* | 10/2010 | Kozitsyn et al. | 455/566 |
| 2010/0306249 A1* | 12/2010 | Hill et al. | 707/769 |
| 2011/0066477 A1* | 3/2011 | Fujioka | 705/14.4 |
| 2011/0282727 A1* | 11/2011 | Phan et al. | 705/14.36 |
| 2012/0110480 A1* | 5/2012 | Kravets | 715/760 |
| 2012/0233312 A1* | 9/2012 | Ramakumar et al. | 709/224 |
| 2012/0291006 A1* | 11/2012 | Quine | 717/105 |
| 2013/0024757 A1* | 1/2013 | Doll et al. | 715/204 |
| 2013/0204715 A1* | 8/2013 | Zhang | 705/14.73 |
| 2013/0254025 A1* | 9/2013 | Liu et al. | 705/14.53 |
| 2014/0108922 A1* | 4/2014 | Gravity et al. | 715/246 |
| 2014/0351268 A1* | 11/2014 | Weskamp et al. | 707/748 |

OTHER PUBLICATIONS

U.S. Appl. No. 13/760,485, filed Feb. 6, 2013, and entitled "Assigning Slots to Contents in a Pipeline."

\* cited by examiner

401

ASSIGNING SLOTS TO USER INTERFACE ELEMENTS

BACKGROUND

A network site may include any number of content pages, such as web pages. A network site for an online retailer may include, for example, one or more content pages for each category of items offered for order by the online retailer as well as other content pages. When a request to generate a content page is received from a client device via a browser, for example, the network site can personalize the content placed in the content page depending upon various factors.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to placement of content, such as user interface widgets, within page slots defined by a page template that is associated with a content page of a network site. Embodiments of the disclosure can select user interface widgets for placement within a content page from among multiple candidates based upon an effectiveness metric that is calculated for the candidate user interface widgets. In the case of a content page generated for an online retailer site or electronic commerce system, this effectiveness metric can be related to the profit and/or revenue generated by the user interface widget in relation to other user interface widgets. Additionally, page slots can also be segmented into various slot groups in which user interface widgets can be selected for placement in response to a request to generate a content page.

Although the various embodiments herein are described in the context of a network site configured for an online retailer, it is understood that the principles disclosed herein may apply to any type of network site (e.g., search engine, social networking system, etc.) that could benefit from selection and/or placement of user interface widgets in a content page depending upon any type of ranking of the user interface widgets according to any metric.

Figure 1:
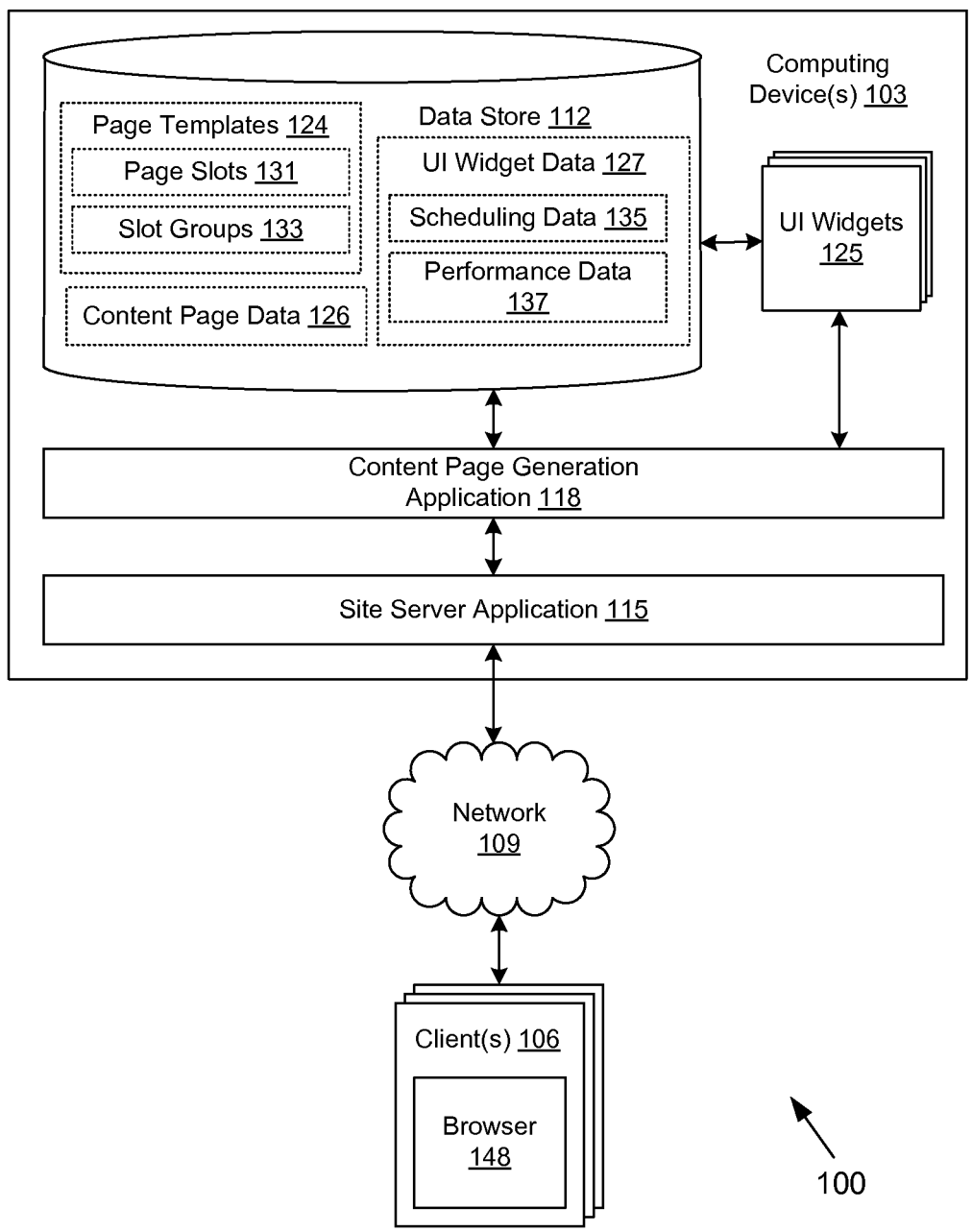
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other computing device or system providing computing capability. The computing device 103 may represent multiple computer systems arranged, for example, in one or more server banks or other arrangements. To this end, the computing device 103 may comprise, for example, a cloud computing resource, a grid computing resource, and/or any other distributed computing arrangement. Such computer systems may be located in a single installation or may be dispersed among many different geographical locations. For purposes of convenience, the computing device 103 is referred to herein in the singular. However, in one embodiment, the computing device 103 represents a plurality of computer systems arranged as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a site server application 115, a content page generation application 118, user interface (UI) widgets 125, and other applications, services, processes, systems, engines, or functionality not discussed in detail herein. The site server application 115 is executed to receive content page requests from the client 106 over the network 109, and to serve up content pages in response to the content page requests. The site server application 115 may comprise a web server application such as Apache Hypertext Transfer Protocol (HTTP) Server, Microsoft® Internet Information Services (IIS), and/or any other type of content page server application.

The content page generation application 118 is executed in response to a content page request received by the site server application 115 in order to generate a content page corresponding to the content page request. The content page generation application 118 can dynamically assemble a content page from a page template by generating a content page in which content generated from various user interface widgets are placed depending upon various factors associated with the request as will be described herein. In one embodiment, the content page generation application 118 includes an interpreter for JavaServer Pages (JSP) that generates a content page, such as a hypertext markup language (HTML) page from a JSP page that defines how the HTML page should be dynamically generated.

UI widgets 125 define one or more functional applications and/or services that may be executed to provide dynamic content for placement within a content page. As a non-limiting example, a UI widget 125 may generate markup language that is placed within a content page generated by the content page generation application 118 in response to a request to generate a content page received from a client 106. In one embodiment, a UI widget 125 can comprise JavaScript code or other client-side code that retrieves data that can be placed within a content page generated from a page template 124. In one embodiment, a UI widget 125 may comprise code that is executed by the content page generation application 118 to retrieve product recommendations as well as hyperlinks, text and imagery associated with the recommendations that can be placed in the content page. In this example, the product recommendations can be tailored to a user account associated with a user. Thus, the UI widget 125 can detect a user account associated with a browser session and obtain product recommendations generated by a product recommendation engine and place content related to the recommendations in the content page.

In some embodiments, UI widgets 125 can be implemented as services that listen for an event associated with a request to generate a content page that is received by the site server application 115. When the site server application 115 and/or content page generation application 118 receives such a request, the UI widgets 125 can initiate content placement requests that represent requests to schedule content for placement within the content page that is generated responsive to the request received from the client 106 to generate a content page. In response to a content placement request from UI widgets 125, the content page generation application 118 can select markup language generated by certain UI widgets 125 for placement in the content page based upon an effectiveness metric associated with the UI widgets 125 initiating such a request as well as other considerations.

In other embodiments, the content page generation application 118 can generate a ranking of UI widgets 125 with respect to a known set of available UI widgets 125 based upon performance data as well as scheduling data that is stored in the data store 112 without receiving a scheduling request from a UI widget 125 implemented as a service that listens for requests to generate content pages. In this scenario, the content page generation application 118 can select certain UI widgets 125 according to data stored in the data store 112 and request the selected UI widgets 125 to generate markup language for placement within a content page.

The data stored in the data store 112 includes, for example, page templates 124, content page data 126, and user interface widget data 127. Page templates 124 can specify the placement of user interface elements with which a user on a client 106 can interact. As a non-limiting example, in an electronic retail site implemented by the computing device 103, the page templates 124 can specify the placement of text, imagery, buttons, etc., which can include user interface elements that facilitate the purchase of an item (e.g., an "Add to Cart" button). As an alternative example, a page template 124 for a search engine implemented by the computing device 103 can specify where imagery, search forms, search results, etc. are placed on a content page generated by the content page generation application 118 for a user on a client 106.

The data store 112 also includes various user interface widget data 127 such as images, strings, video and other data that can be incorporated into markup language generated by a user interface widget 125. The markup language can be placed within a content page based upon a page template 124. Widget data 127 can also include scheduling data 135 and performance data 137 associated with the various widgets 125 that can be requested to generate markup language for placement within one or more page slots 131. Scheduling data 135 can include scheduling constraints and/or requirements regarding the placement of UI widgets 125 within a content page generated by the content page generation application 118. For example, scheduling data 135 can specify a percentage of content pages corresponding to a specific page template 124 in which a UI widget 125 should be placed due to business reasons, aesthetic factors, or any other factors as can be appreciated. For example, scheduling data 135 can be employed to manually override selection of UI widgets 125 for placement within a content page generated by the content page generation application 118 irrespective of the ranking of a UI widget 125 according to an effectiveness metric.

Performance data 137 can provide performance data associated with the various available UI widgets 125 according to the effectiveness metric. Accordingly, the content page generation application 118 can select UI widgets 125 based upon the performance data 137 and request that certain UI widgets 125 generate markup language for placement within a content page based upon the performance data 137 as well as scheduling constraints defined by the scheduling data 135.

The content page data 126 includes content pages and components thereof which are static or not otherwise generated by the content page generation application 118 such as images, strings, and other data incorporated into a content page. Page templates 124 also include one or more page slots 131 that specify locations within a content page in which content such as UI widgets 125 can be placed. Page slots 131 can also be associated with a placement value that indicates a value of a particular page slot 131 relative to other page slots 131 that are within a page template 124. The placement value can represent a metric that is linked with an amount of user attention that a particular page slot is predicted to receive based upon its location in a content page. For example, a top center page slot may be associated with the highest placement value because it may receive the highest amount of user attention as compared to a page slot in a footer location. Additionally, a placement value can also take into account one or more other factors, such as a click rate associated with the page slot 131, a conversion rate associated with content placed in the page slot 131, and/or economic factors, such as a profitability or revenue metric associated with the page slot 131. The placement value can also take into account other engagement metrics associated with a page slot 131, such as an amount of time that a population of users of a site interacts with the page slot 131 relative to other page slots 131 in the page template 123. Such an engagement metric can be represented by a mouse hover time associated with the page slot 131 or any other form of user interaction with a location within a page template 123. Accordingly, the page slots 131 of a particular page template 123 can be effectively ranked within a page template 124 according to the placement value associated with each page slot 131.

Page slots 131 can also be grouped into slot groups 133. A slot group 133 can include multiple page slots 131 that possess a common characteristic, such as a geometry of the page slot 131, proximity of the page slots 131 relative to one another, and/or placement values of the page slots 131. For example, page slots 131 having a common geometry can be assigned to a common slot group 133. Accordingly, the UI widgets 125 that are candidates for placement within the page slots 131 can be chosen to produce markup language for the common geometry and without regard to a particular page slot 131 within the slot group 133 in which the UI widget 125 is placed.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 148 and/or other applications. The browser 148 may be executed in a client 106, for example, to access and render content pages, such as web pages, or other network content served up by the computing device 103 and/or other servers. The client 106 may be configured to execute applications beyond browser 148 such as, for example, email applications, instant message applications, and/or other applications.

Next, a general description of the operation of the various components of the networked environment 100 is provided. To begin, a browser 148 executed in a client 106 can generate a request to generate a content page, which is transmitted via the network 109 to the site server application 115. The site server application 115 can invoke the content page generation application 118, which identifies a particular page template 124 associated with the requested content page and dynamically generates a content page, which the site server application 115 transmits to the client 106 via the network 109.

Accordingly, to generate such a content page in response to receiving a request to generate a content page, the content page generation application 118 selects UI widgets 125 for placement in the content page. The content page generation application 118 requests that the selected UI widgets 125 generate markup language that can be incorporated into the content page markup language within respective page slots 131 specified by the page template 124. The content page generation application 118 can then generate a ranking of the UI widgets 125 corresponding to the content placement requests according to an effectiveness metric or placement score, which, as noted above, can be related to profitability, revenue, or any other metric as can be appreciated.

An effectiveness metric can also be related to a volume of items sold by a particularly UI widget 125 in an electronic commerce system. The effectiveness metric can also relate to an engagement metric, such as a click-through rate associated with a particular UI widget 125. Another example of such an engagement metric is a dwell time, or an amount of time that a population of users of a site focus their attention (e.g., hovers a mouse pointer above or near a UI widget 125, etc.), on a particular UI widget 125 relative to other UI widgets 125. The engagement metric can further relate to a conversion rate of a UI widget 125, where conversion of a user can be defined in various ways. For example, conversion of a user can correspond to engagement or interaction with a widget, whether the UI widget 125 results in the sale of a particular item in an electronic commerce system, or any other type of user conversion as can be appreciated.

Accordingly, the performance data 137 can define the effectiveness metric associated with the various widgets upon which a ranking can be based. Calculation of such a score and ranking of UI widgets 125 according to a calculated score can be accomplished as described in U.S. patent application Ser. No. 11/758,932 filed Jun. 6, 2007 and entitled "Real-time Adaptive Probabilistic Selection of Messages," which is incorporated herein by reference in its entirety. The effectiveness metric can also include some degree of randomness so that lowly ranked UI widgets 125 and/or new UI widgets 125 receive an opportunity for placement within content pages.

As noted above, in one embodiment, the content page generation application 118 can generate an event that informs the various UI widgets 125 that a request to generate a content page has been received. In response to such a request, one or more UI widgets 125 can generate requests for placement within the content page. In response to receiving such a request, the content page generation application 118 can generate a ranking of the UI widgets 125 according to the effectiveness metric of the various widgets.

The content page generation application 118 can then select the highest ranked UI widgets 125 according to the effectiveness metric and request that the highest ranked UI widgets 125 generate markup language for placement within available page slots 131 defined by the page template 124. In some embodiments, the content page generation application 118 can also place the UI widgets 125 into the page slots 131 so that the highest ranked UI widget 125 is placed in the page slot 131 having the highest placement value, the second highest ranked UI widget 125 is placed in page slot 131 having the second highest placement value, and so on. In this way, the content page generation application 118 can optimize placement of UI widgets 125 across an entire content page corresponding to a particular page template 124 rather than just within a single page slot that may be defined by the page template 124.

It should be appreciated that some UI widgets 125 considered for placement within the content page may fail to achieve a high enough ranking relative to other UI widgets 125 and that these UI widgets 125 may fail to gain placement within the content page. In other words, there may be more UI widgets 125 considered for placement within the content page than there are available page slots 131. In some scenarios, a single UI widget 125 can be associated with multiple requests to place content within a content page corresponding to a page template 124 in response to a single request to generate a content page. For example, a UI widget 125 can be configured to generate multiple types of content for placement in a content page. A UI widget 125 configured to generate product recommendations in an online retail site may generate recommendations related to a user's purchase history when invoked a first time and then may generate recommendations related to recently viewed products by the user when invoked a second time.

Additionally, in some embodiments, the content page generation application 118 can also consider the various UI widgets 125 for placement within the various slot groups 133 defined by the page template 124 according to one or more properties associated with each of the slot groups 133. The content page generation application 118 can then generate a ranking of UI widgets 125 considered for placement in a particular slot group 133 according to the effectiveness metric. The properties associated with each of the slot groups 133 can comprise one or more properties shared by the page slots 131 within the slot groups 133, such as, geometry of the page slots 131, location of the page slots 131 within the page template 124, a placement value range, or other properties of a page slot 131 as can be appreciated. Upon generating a ranking of the UI widgets 125 for each of the slot groups 133, the content page generation application 118 assigns the UI widgets 125 to page slots 131 within the slot groups 133 according to the ranking and placement value of the page slots 131. For example, a highest ranked UI widget 125 is assigned to a page slot 131 within a slot group 133 having the highest placement value, a second highest ranked UI widget 125 is assigned to a page slot 131 within the slot group 133 having the second highest placement value, and so on.

Upon assigning a UI widget 125 to a particular page slot 131 according to an effectiveness metric ranking as well as placement value of the page slot 131, the content page generation application 118 can request that the UI widgets 125 generate markup language for placement within their assigned page slots 131. In one embodiment, the content page generation application 118 can initiate these requests in parallel to speed the time required for generation of a content page in response to a request to generate the content page received from a client 106. Additionally, the markup language generated by certain UI widgets 125 may be dependent upon the ranking of the UI widget 125 relative to other UI widget 125. Accordingly, the content page generation application 118 can provide to a UI widget 125 its ranking relative to other widgets scheduled for placement in the request to generate markup language. In some embodiments, the content page generation application 118 can provide the UI widgets 125 that are ranked above a particular UI widget 125 according to the effectiveness metric.

In some scenarios, one or more of the UI widgets 125 placed in a page slot 131 of the page template 124 corresponding to the requested content page may experience an error that causes generation of the markup language to fail. Accordingly, in such a scenario, the content page generation application 118 can select a next highest ranked UI widget 125 according to the effectiveness metric and request that the next highest ranked UI widget 125 generate markup language for placement within the content page. The content page generation application 118 can provide in the request an identity of the UI widgets 125 that are, at the time of failure, ranked above the UI widget 125 according to the effectiveness metric in the event that the next highest UI widget 125 is context aware.

In one embodiment, the UI widgets 125 can be associated with an error rate that expresses how often a given UI widget 125 experiences an error and fails to generate markup language when requested to do so by the content page generation application 118. Accordingly, if an error rate of a UI widget 125 exceeds a predefined threshold, or if the UI widget 125 is "error prone," the content page generation application 118 can request the next highest ranked unscheduled UI widget 125 to generate markup language without waiting for the error prone UI widget 125 to return an error to the content page generation application 118.

Additionally, a UI widget 125 can define data dependencies that the content page generation application 118 can analyze to anticipate whether a UI widget 125, if placed in a content page, will experience an error if requested to generate markup language. For example, in the case of a UI widget 125 in an online retail site, the UI widget 125 may define a data dependency related to a virtual shopping cart of a user, whether a user account associated with a given session can be identified, and/or any other environmental variable or conditions that may govern whether the UI widget 125 can successfully generate markup language when requested to do so. If the content page generation application 118 can determine that a data dependency defined by a UI widget 125 is not present, then the content page generation application 118 can request the next highest widget to generate markup language without waiting for the UI widget 125 to experience an error.

In other embodiments, the content page generation application 118 can request additional UI widgets 125 beyond those that are selected for the page slots 131 in a given page template 124 to generate markup language for placement within the content page in the event that one or more of the selected UI widgets 125 experiences an error. In other words, the content page generation application 118 can pre-fetch markup language from UI widgets 125 that are unscheduled in the event that a scheduled UI widget 125 experiences an error.

Figure 2:
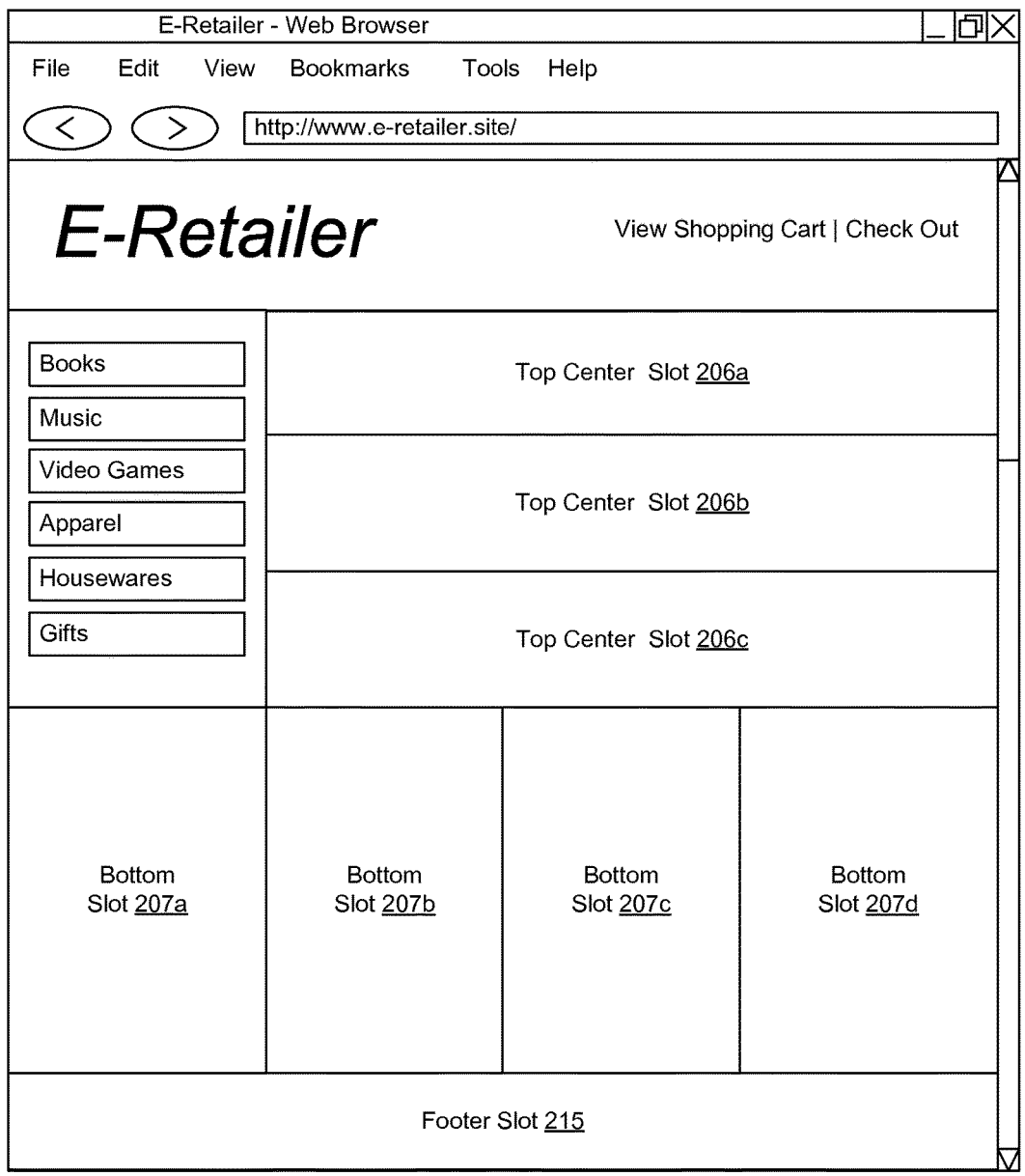
FIG. 2 is a drawing of an example of an illustration of page slots in a content page associated with a page template employed in the networked environment of FIG. 1 according to various embodiments of the present disclosure.

Referring next to FIG. 2, shown is one example of a representation of a content page 201 corresponding to a page template 124. The example of FIG. 2 is purely illustrative and is not meant to represent a content page generated by the content page generation application 118 or a page template 124 from which a content page is generated. The illustrative example of FIG. 2 shows the various page slots 131 that can be defined by a page template 124 corresponding to the content page 201. As shown in FIG. 2, slots 206a, 206b, and 206c are positioned in a center portion of the content page 201 and may be associated with a respective placement values from highest to lowest in that order. Slots 207a, 207b, 207c, and 207d may be associated with lower placement values than slots 206a, 206b, and 206c and are ranked from highest to lowest from left to right as they appear in the content page 201. A footer slot 215 may be associated with the lowest placement value relative to the other page slots within the content page 201.

Accordingly, when a request to generate the content page is received by the content page generation application 118, the content page generation application 118 can consider the various UI widgets 125 for placement within the content page. As noted above, in some embodiments, the content page generation application 118 can generate an event that informs the various UI widgets 125 of the incoming request, which can in turn submit requests to schedule content within the content page that is generated by the content page generation application 118. The content page generation application 118 can generate a ranking according to a placement score and/or performance data 137 associated with the UI widgets 125 considered to schedule content in the content page.

Figure 3A:
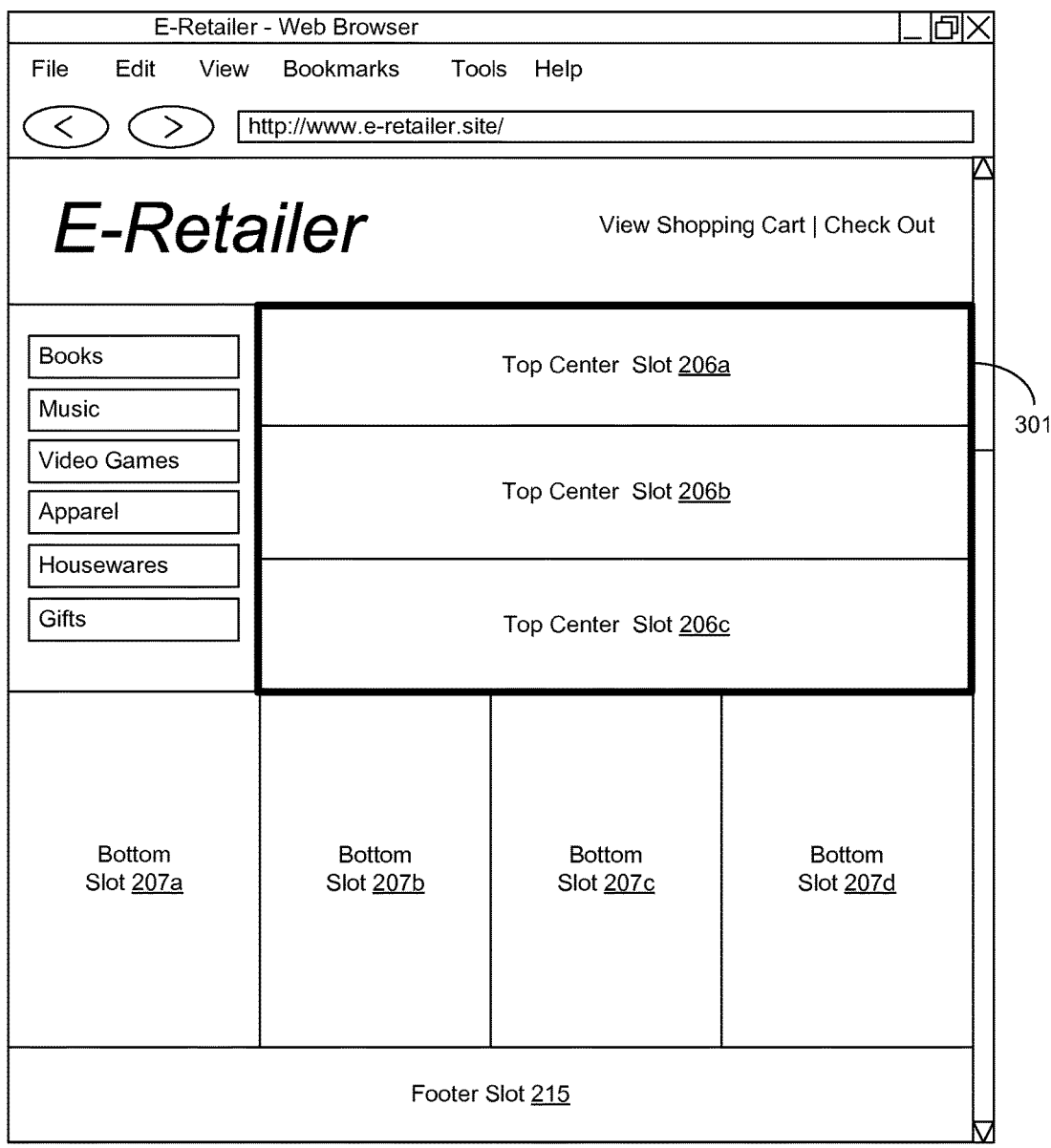
FIGS. 3A-3D are drawings of slot groups in a content page associated with a page template employed in the networked environment of FIG. 1 according to various embodiments of the present disclosure.
Figure 3B:
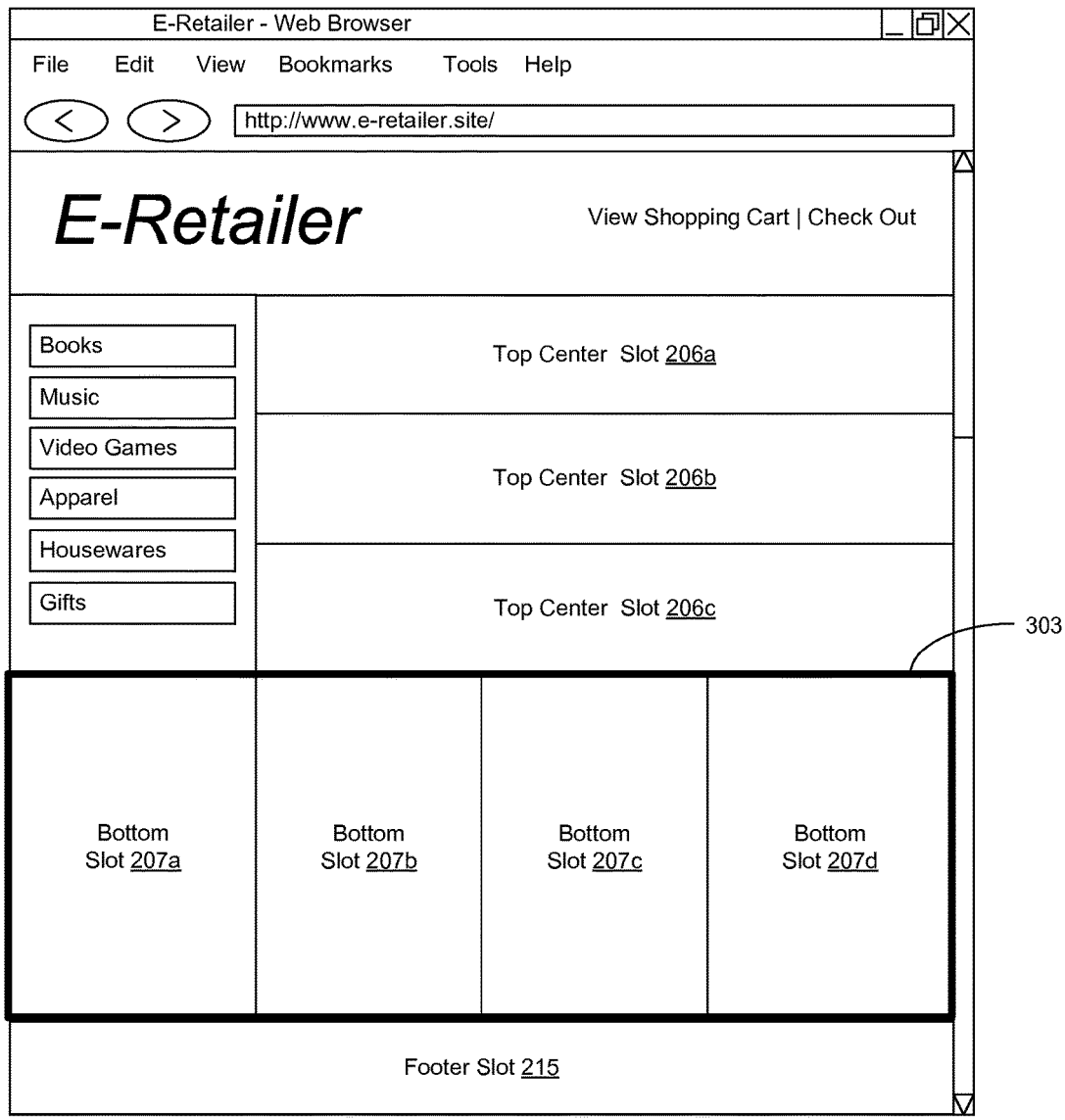
Figure 3C:
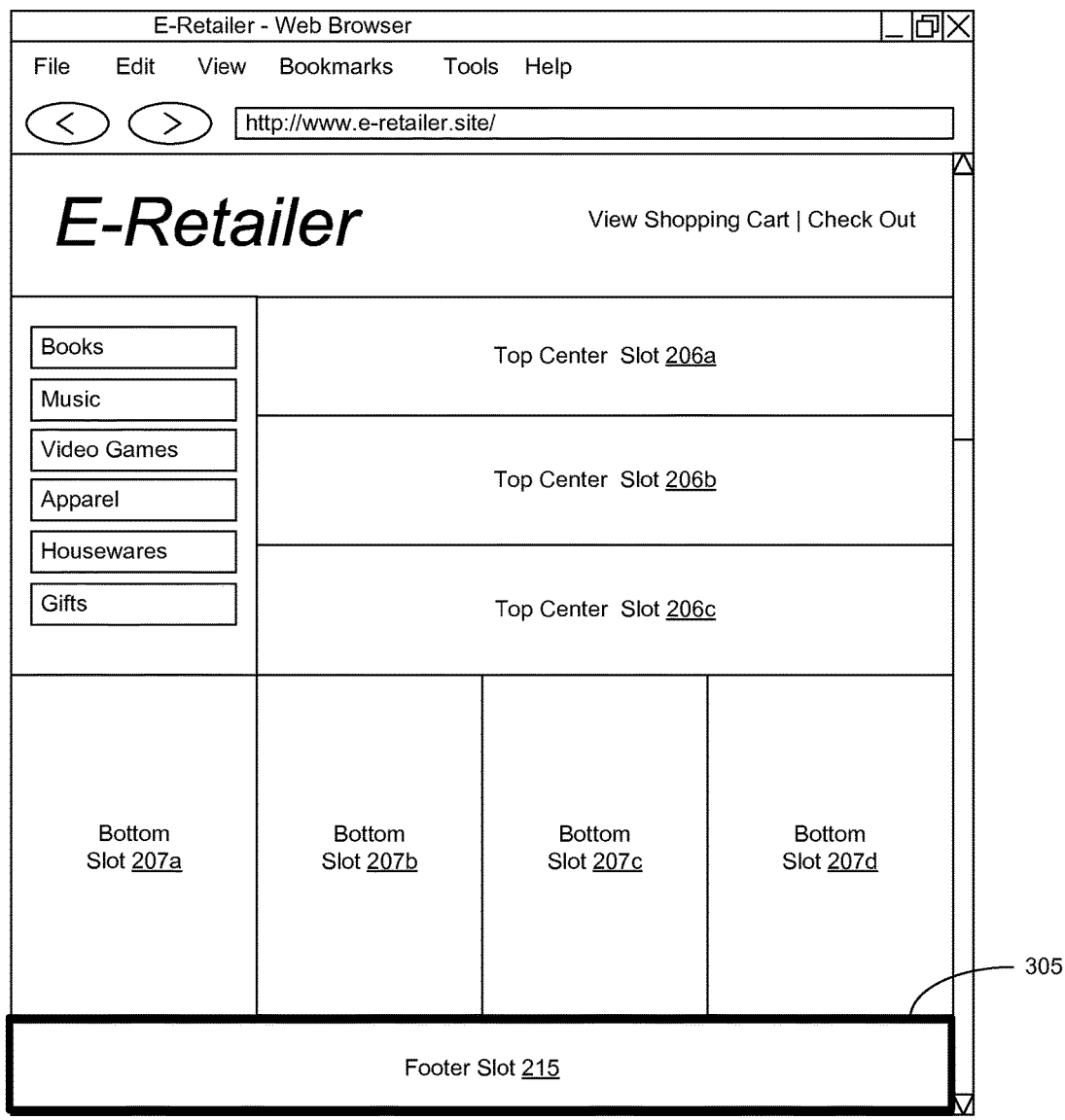
Figure 3D:
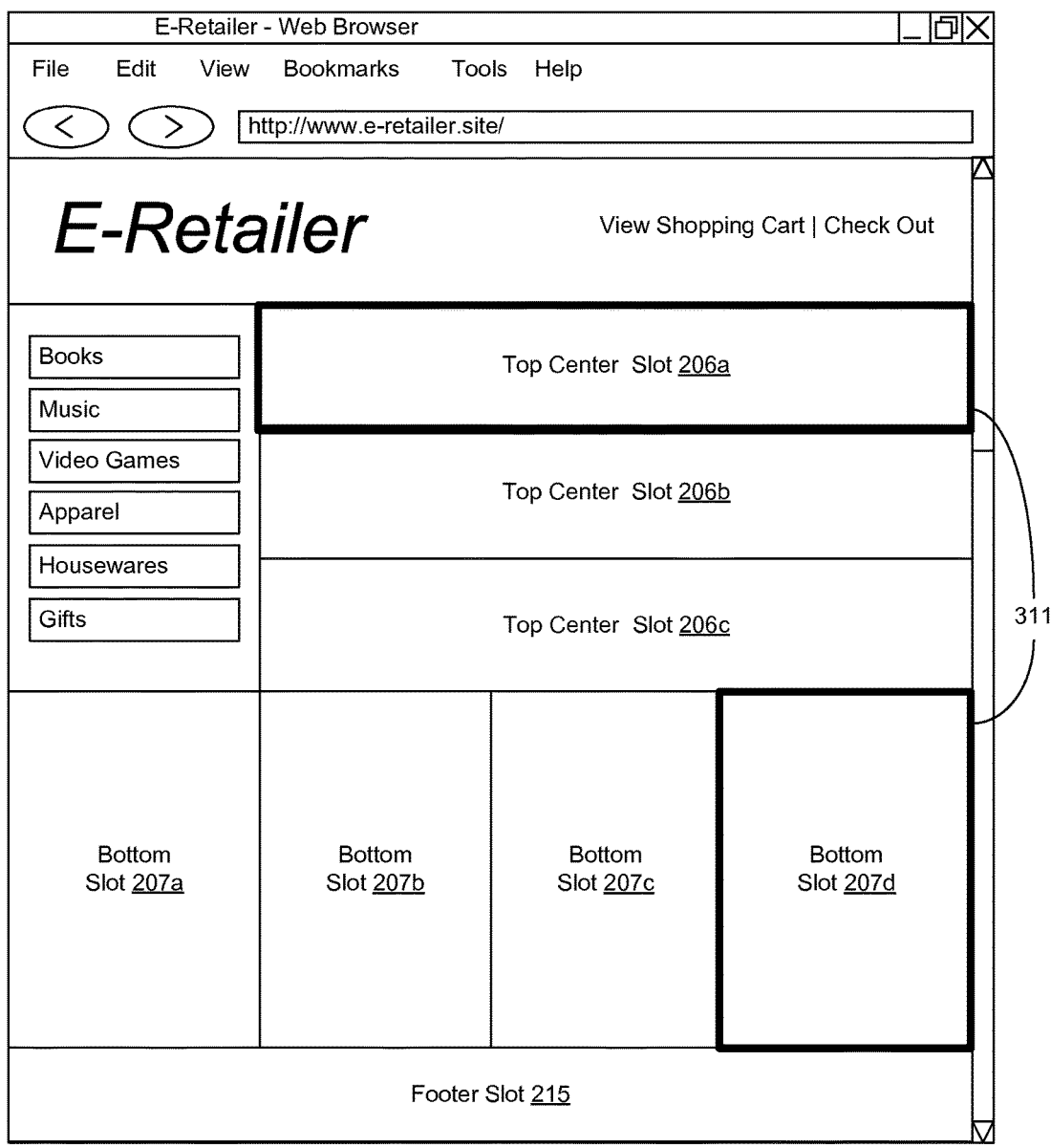

Reference is now made to FIGS. 3A-3D, which illustrate how the page slots 131 associated with the content page 201 can also be segmented into slot groups. In the depicted example, slot group 301 is associated with slots 206a, 206b, and 206c, which have a similar geometry. Similarly, as shown in FIG. 3B, slot group 303 is associated with slots 207a, 207b, 207c, and 207d, which also have a similar geometry. Finally, as shown in FIG. 3C, footer slot 215 is associated with slot group 305. It should be appreciated that page slots 131 need not be grouped together with other page slots 131 having a similar geometry and/or location within a page template 124. For example, as shown in FIG. 3D, slot group 311 can be associated with slots 206a and 207d, which share neither geometry nor location within the content page 201.

Therefore, upon receiving a request to generate the depicted content page 201, the content page generation application 118 polls the UI widgets 125 and/or generates an event corresponding to the request. The content page generation application 118 provides an indication of the page slots and/or slot groups that are present within the depicted content page, and UI widgets 125 can then generate requests to schedule content within one or more of the slot groups 301, 303, and 305. Additionally, the content page generation application 118 can also provide an indication of a common characteristic shared between the slots within each of the slot groups, such as the dimensions of the slots within each of the slot groups, the placement value of one or more of the slots, the locations of the slots in the page template 124, or any other characteristic of the slots and/or slot groups.

Accordingly, the requests received from the various UI widgets 125 can be specific to one or more of the slot groups 301, 303, and 305 that are defined by the page template 124 corresponding to the content page 201. As one example, a UI widget 125 may be configured to only request scheduling of content in a slot and/or slot group that is associated with a particular geometry, placement value and/or location within content page. Therefore, a request to schedule content may be limited to a particular slot and/or slot group. As described above, the content page generation application 118 can then generate a ranking of the UI widgets 125 requesting content to be scheduled in the content page. In the example of FIGS. 3A-3D, the content page generation application 118 can generate such a ranking on a group by group basis so that three independent rankings are generated. For example, a ranking of UI widgets 125 requesting placement within slot group 301 is generated and the content page generation application 118 places the highest ranked UI widget 125 with respect to the slot group into the page slot having the highest placement value. The same process is performed for the remaining slot groups 303 and 305.

Figure 4:
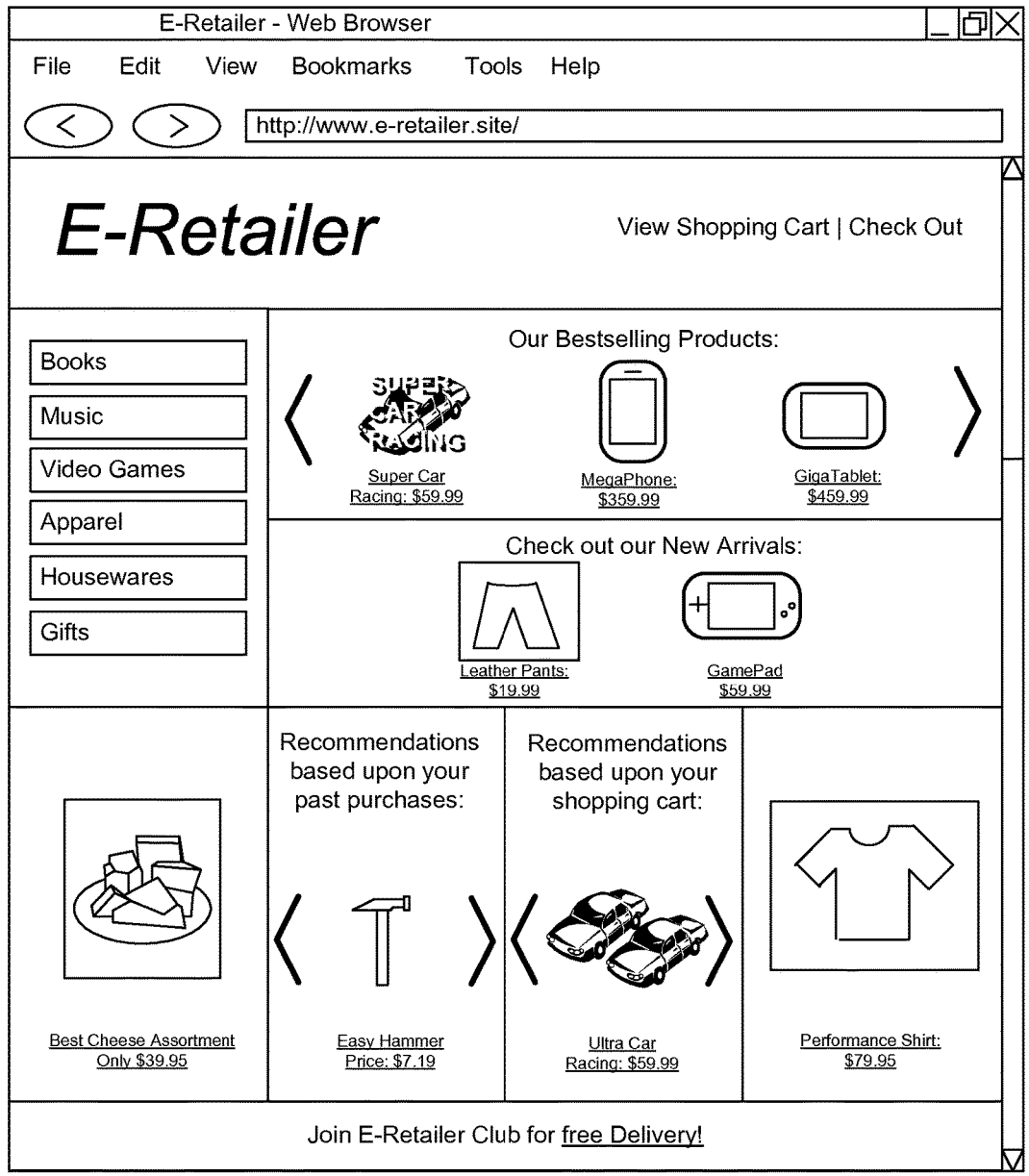
FIG. 4 is a drawing of an example content page generated by the content page generation application executed by a computing device in the networked environment of FIG. 1 according to various embodiments of the present disclosure.

Referring next to FIG. 4, shown is an example content page 401 that can be generated by the content page generation application 118 and transmitted to a client 106 via the network 109. In the example of FIG. 4, the content page generation application 118 has received various content scheduling requests associated with the various slot groups associated with the content page 401 as shown with reference to FIGS. 3A-3D. Upon generating a ranking of the UI widgets 125 requesting placement within the content page 401, the content page generation application 118 then matches the highest ranked UI widgets 125 according to the effectiveness metric with the page slots (or page slots within a requested slot group) having the highest placement value. The content page generation application 118 then requests that the UI widgets 125 corresponding to these requests generate markup language for placement within the various page slots. The content page generation application 118 can pass one or more parameters along with these requests to generate markup language, including a ranking of the respective UI widgets 125 according to the effectiveness metric relative to other UI widgets 125 scheduled for placement within the content page and/or within a particular slot group. As another example, the content page generation application 118 can pass one or more parameters identifying the particular UI widgets 125 that are ranked ahead of a UI widget 125 in the event that the UI widgets 125 selected for placement within the content page 401 are context aware.

Upon receiving the markup language from each of the various UI widgets 125 scheduled for placement within the content page 401, the content page generation application 118 can generate the markup language associated with the entire content page 401 and transmit the generated page to a client 106. As noted above, in some scenarios, a UI widget 125 scheduled for placement within a page slot 131 may encounter an error and fail to generate any markup language when requested by the content page generation application 118. For example, certain UI widgets 125 may require that a user be logged into a user account associated with an online retail site in order to generate personalized content. If the user is not logged into a user account, the UI widget 125 may return an error instead of generating markup language.

Therefore, in such a scenario, the content page generation application 118 can select the next highest ranked UI widget 125 according to the effectiveness metric that was not selected to placement in the content page 401. The content page generation application 118 can request that the next highest ranked UI widget 125 generate markup language for inclusion in the content page 401, and such a request can include the ranking of the UI widget as well as the identity of the UI widgets 125 that are ranked higher than the UI widget 125 according to the effectiveness metric.

Figure 5:
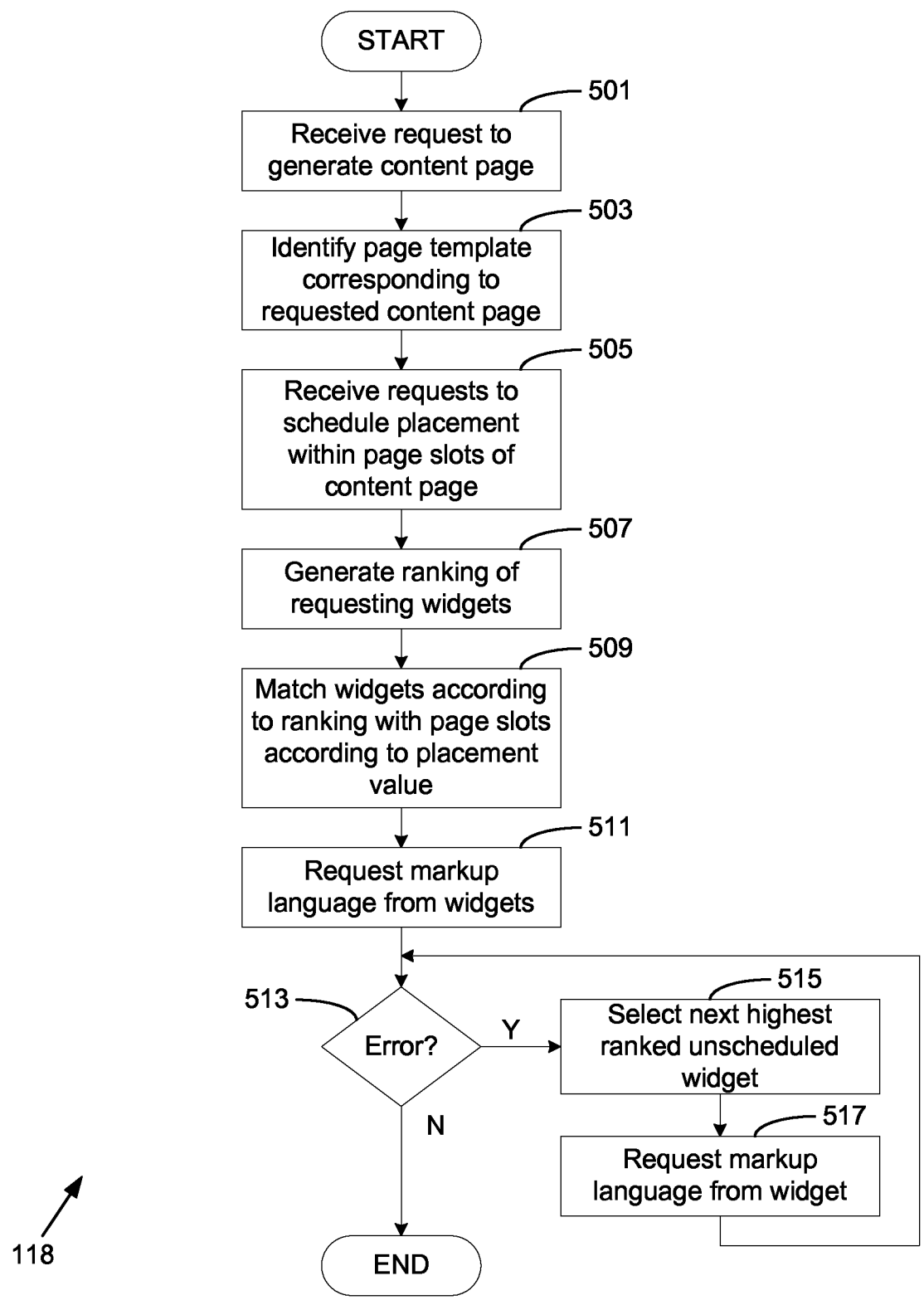
FIG. 5 is a flowchart illustrating an example of functionality implemented as portions of a content page generation application executed in a computing resource in the networked environment of FIG. 1 according to various embodiments of the present disclosure.

Referring next to FIG. 5, shown is a flowchart that provides one example of the operation of a portion of the content page generation application 118 according to various embodiments. It is understood that the flowchart of FIG. 5 provides merely an example of the many different types of functional arrangements that may be employed to implement the operation of the portion of the content page generation application 118 as described herein. As an alternative, the flowchart of FIG. 5 may be viewed as depicting an example of steps of a method implemented in the computing device 103 (FIG. 1) according to one or more embodiments.

Beginning with box 501, the content page generation application 118 can receive a request to generate a content page that is, for example, requested via browser 148 executed by a client 106 via a network 109. In box 503, the content page generation application 118 identifies a page template 124 corresponding to the requested content page. The page template 124 defines the structure of the content page that and specifies the location, size, placement value, and other attributes associated with page slots 131. Additionally, the page template 124 specifies whether the page slots 131 in a content page are grouped into slot groups 133.

In some embodiments, a page template 124 corresponding to a content page generated by the content page generation application 118 can be dynamically generated. In other words, a page template 124 corresponding to a content page created by the content page generation application 118 and transmitted to a client may be generated in real time upon receipt of a request to generate a content page. In this scenario, the page slots 131, slot groups 133 as well as corresponding placement values for the page slots 131 are calculated in real time. The placement value of page slot 131 in such a page template 124 can be calculated by employing a heuristic approach that calculates placement values based upon the placement value of page slots 131 in another preexisting page template 124. In such a scenario, the placement value of page slots 131 in a dynamically generated page template 124 can be calculated based upon the known placement value of slots in another page template 124 of similar geometry and/or location within the page template 124.

In box 505, the content page generation application 118 receives and/or generates requests to schedule content in the content page. The requests can comprise requests to schedule content within a particular slot group defined by the page template 124 or requests to schedule content within the entire content page. The requests can be received from UI widgets 125 executed by the computing device 103 and/or generated by the content page generation application 118 by consulting scheduling data 135 and/or performance data 137.

In box 507, the content page generation application 118 generates a ranking of the UI widgets 125 considered for placement in the content page according to an effectiveness metric. In the event that the page template 124 defines slot groups 133, the content page generation application 118 can generate a ranking of the UI widgets 125 requesting placement for each of the slot groups 133. In box 509, the content page generation application 118 matches the UI widgets 125 with page slots 131 defined by the page template 124 according to the effectiveness metric ranking and the placement value of the page slots 131. In other words, the highest ranked UI widget 125 within the page template 124 and/or a particular slot group 133 is matched with the page slot 131 having the highest placement value. Similarly, the second highest ranked UI widget 125 within the page template 124 and/or a particular slot group 133 is matched with the page slot 131 having the second highest placement value, and so on.

In box 511, the content page generation application 118 requests markup language from the UI widgets 125 scheduled for placement within the content page. The markup language can include HTML, for example, and is placed within the content page generated by the content page generation application 118. As noted above, the requests to generate markup language can be initiated in parallel to minimize latency associated with producing a content page responsive to a request from a browser 148.

If one or more of the UI widgets 125 encounters an error and/or fails to generate markup language for inclusion in the content page in its assigned page slot in box 513, the content page generation application 118 can select the next highest ranked unscheduled UI widget 125 in box 515. In some embodiments, the next highest ranked unscheduled UI widget 125 may be one that has already been scheduled for placement in another page slot 131 in the content page. Accordingly, the content page generation application 118 an inform the next highest ranked unscheduled UI widget 125 of the identity of the widgets that are ranked above the widget within the content page and/or slot group 133 in the event that the widget is context aware. In box 517, the content page generation application 118 can request markup language from the replacement widget. Thereafter, the portion of the content page generation application 118 ends.

Figure 6:
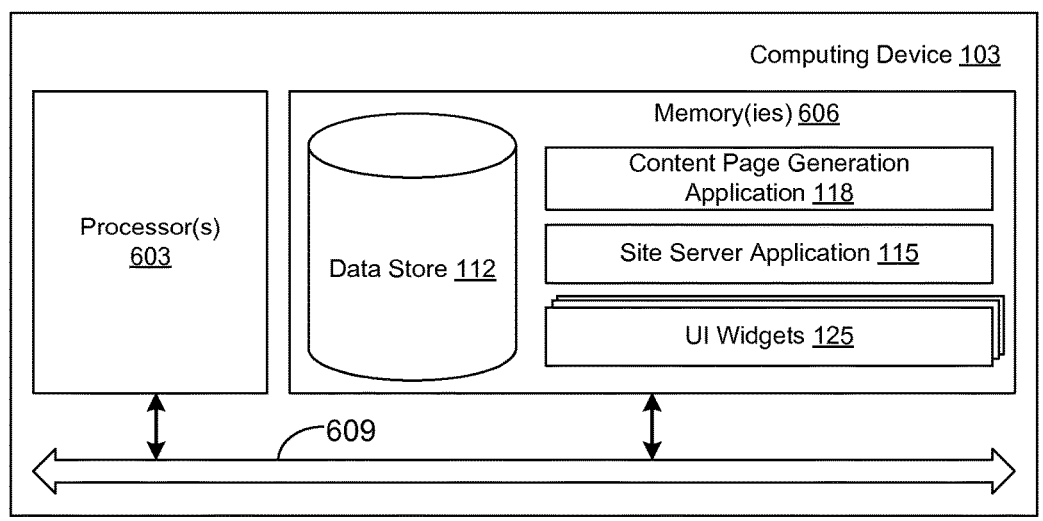
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the content page generation application 118, the site server application 115, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the content page generation application 118, the site server application 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the content page generation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content page generation application 118, and the site server application 115, that comprises software or code can be embodied in any computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program causing the computing device to at least:
   receive a request to generate a content page from a browser executed on a client device;
   identify a page template corresponding to the requested content page;
   identify a plurality of slot groups associated with the page template, each of the slot groups comprising at least one page slot having a common geometry and located at a common location within the page template, the at least one page slot specifying a location within the page template in which content can be placed, the at least one page slot further being associated with a respective placement value indicating a value of the location within the page template, the respective placement value based upon an engagement metric expressing an amount of user interaction with the at least one page slot relative to other page slots;
   generate a ranking of a plurality of user interface widgets according to an effectiveness metric, wherein the ranking is randomized according to a degree of randomness so that lowly ranked ones of the plurality of user interface widgets have an opportunity to be highly ranked according to the effectiveness metric, the plurality of user interface widgets configured to generate markup language for placement within the content page;
   match the at least one page slot associated with each of the slot groups with at least a subset of the plurality of user interface widgets according to the ranking, the respective
   placement value, and whether a geometry of the at least one page slot matches a requested geometry of a particular one of the plurality of user interface widgets;
   request that a plurality of respectively ranked user interface widgets generate markup language for placement within a respectively ranked page slot;
   determine, prior to transmission of the content page to the browser rendering the content page on behalf of the client device, whether any of the plurality of respectively ranked user interface widgets returns an error in response to the request to generate markup language;
   prior to requesting that the at least a subset of the plurality of user interface widgets returning an error generating any markup language, initiate a request to generate markup language for a next highest ranked user interface widget according to the ranking that is not among the subset of the plurality of user interface widgets; and
   generate the content page with the markup language generated by the plurality of respectively ranked user interface widgets that fail to return an error placed within the respectively ranked page slot.

2. A system, comprising:
   at least one computing device; and
   a content page generation application executable in the at least one computing device, the content page generation application causing the at least one computing device to at least:

receive a request to generate a content page;

identify a page template corresponding to the requested content page, the page template comprising a plurality of page slots corresponding to a plurality of content locations in the content page, the page slots being ranked according to a placement value and being grouped into a plurality of slot groups, wherein members of a slot group have a common geometry and are located at a common location within the page template, and the placement value is based upon an engagement metric expressing an historical amount of user interaction with each of the page slots relative to other page slots;

generate a ranking of a plurality of user interface widgets according to an effectiveness metric, wherein the ranking is randomized according to a degree of randomness so that lowly ranked ones of the plurality of user interface widgets have an opportunity to be highly ranked according to the effectiveness metric;

match the plurality of page slots with at least a subset of the plurality of user interface widgets according to the ranking, the placement value, and whether a geometry of the at least one page slot matches a requested geometry of a particular one of the plurality of user interface widgets;

determine, prior to transmission of the content page to a browser rendering the content page on behalf of a client device, whether any of the at least a subset of the plurality of user interface widgets returns an error in response to a request to generate markup language for placement in a page slot;

prior to requesting that the at least a subset of the plurality of user interface widgets returning an error generating any markup language, initiate a request to generate markup language for a next highest ranked user interface widget according to the ranking that is not among the subset of the plurality of user interface widgets; and generate the content page with at least a subset of the plurality of user interface widgets corresponding to the plurality of page slots.

3. The system of claim 2, wherein the page template corresponding to the requested content page is dynamically generated in response to receiving the request to generate the content page.

4. The system of claim 2, wherein the effectiveness metric is associated with at least one of a profitability amount, a revenue amount, or a volume of sold items associated with a corresponding user interface widget in an electronic commerce system.

5. The system of claim 2, wherein the content page is generated with at least a subset of the plurality of user interface widgets corresponding to the plurality of page slots by requesting each of the at least a subset of the plurality of user interface widgets to generate markup language for placement within the content page.

6. The system of claim 5, wherein each of the at least a subset of the plurality of user interface widgets are requested to generate markup language for placement within the content page by providing the ranking of the plurality of user interface widgets to each of the at least a subset of the plurality of user interface widgets.

7. The system of claim 6, wherein the ranking of the plurality of user interface widgets is provided to each of the at least a subset of the plurality of user interface widgets by identifying each of the at least a subset of the plurality of user interface widgets that are more highly ranked than a respective one of the user interface widgets according to the ranking.

8. The system of claim 6, wherein the ranking of the plurality of user interface widgets according to the effectiveness metric is further based at least in part upon scheduling data specifying scheduling constraints associated with at least one of the plurality of user interface widgets.

9. The system of claim 8, wherein the scheduling data specifies a percentage of content pages in which a respective user interface widget should be placed.

10. The system of claim 8, wherein the scheduling data specifies at least one of a page slot or a slot group in the page template in which a respective user interface widget should be placed.

11. The system of claim 5, wherein each of the at least a subset of the plurality of user interface widgets are requested to generate markup language corresponding to each of the at least a subset of the plurality of user interface widgets in parallel.

12. The system of claim 2, wherein at least one of the user interface widgets is configured to generate content based at least in part upon a user account.

13. The system of claim 12, wherein the at least one of the user interface widgets is configured to generate markup language configured to render product recommendations associated with the user account in an electronic commerce system.

14. A method comprising:

receiving, via at least one computing device, a request to generate a content page;

identifying, via the at least one computing device, a page template corresponding to the requested content page, the page template defining at least one slot group, the at least one slot group comprising at least one page slot having a common geometry and located at a common location within the page template, the at least one page slot corresponding to at least one content location in the content page, the at least one page slot being ranked according to a placement value within the at least one slot group, the placement value based upon an engagement metric expressing an historical amount of user interaction with the at least one page slot relative to other page slots;

generating, via the at least one computing device, at least one ranking of a plurality of user interface widgets according to an effectiveness metric, wherein the ranking is randomized according to a degree of randomness so that lowly ranked ones of the plurality of user interface widgets have an opportunity to be highly ranked according to the effectiveness metric;

matching, via the at least one computing device, each page slot within the at least one slot group with a respective user interface widget based at least in part upon the ranking, the placement value of each page slot, and whether a geometry of the at least one page slot matches a requested geometry of a particular one of the plurality of user interface widgets;

determine, prior to transmission of the content page to a browser rendering the content page on behalf of a client device, whether the respective user interface widget matched to each page slot returns an error in response to a request to generate markup language;

prior to requesting that the respective user interface widget returning an error generate any markup language, initiate a request to generate markup language for a next highest ranked user interface widget according to the ranking that is not matched to a respective page slot.

15. The method of claim 14, wherein the effectiveness metric is associated with at least one of a profitability amount, a revenue amount, or a volume of sold items associated with a corresponding user interface widget in an online retail site.

16. The method of claim 14, wherein the effectiveness metric is associated with an engagement metric associated with a corresponding user interface widget, the engagement metric associated with an amount of user interaction with the corresponding user interface widget by a population of users relative to other user interface widgets.

17. The method of claim 14, further comprising generating the content page with the respective user interface widgets corresponding to the at least one page slot.

18. The method of claim 17, wherein generating the content page further comprises requesting, via the at least one computing device, each of the respective user interface widgets to generate markup language corresponding to each of the at least a subset of the plurality of user interface widgets.

19. The method of claim 18, wherein requesting each of the respective user interface widgets to generate markup language corresponding to each of the at least a subset of the plurality of user interface widgets further comprises providing the ranking of the plurality of user interface widgets to each of the at least a subset of the plurality of user interface widgets.

20. The method of claim 19, wherein providing the ranking of the plurality of user interface widgets to each of the at least a subset of the plurality of user interface widgets further comprises identifying, via the at least one computing device, each of the plurality of user interface widgets that are more highly ranked than a respective one of the user interface widgets according the ranking.

21. The method of claim 14, wherein determining whether any of the respective user interface widgets corresponding to the at least one page slot returns an error in response to a request to generate markup language for placement in a page slot further comprises determining whether an error rate associated with any of the respective user interface widgets exceeds a predefined threshold.

22. The method of claim 18, wherein requesting, via the at least one computing device, each of the respective user interface widgets to generate markup language corresponding to each of the at least a subset of the plurality of user interface widgets further comprises initiating, via the at least one computing device, the requests in parallel.

23. The method of claim 14, wherein the respective user interface widget is configured to generate content based at least in part upon a user account associated with an electronic commerce system.

24. The system of claim 2, wherein the content page application causes the at least one computing device to at least:
    determine whether any of the at least a subset of the plurality of user interface widgets is associated with an error rate that meets a threshold error rate; and
    initiate a request to generate markup language for a next highest ranked user interface widget according to the ranking that is not among the subset of the plurality of user interface widgets in response to a determination that the error rate meets the threshold error rate.

25. The system of claim 2, wherein the amount of user interaction being measured by determining an amount of mouse-over time associated with each of the page slots relative to other page slots.

* * * * *

UNITED STATES PATENT AND TRADEMARK OFFICE
CERTIFICATE OF CORRECTION

PATENT NO. : 9,665,556 B1  
APPLICATION NO. : 13/555388  
DATED : May 30, 2017  
INVENTOR(S) : Sutariya et al.

Page 1 of 1

It is certified that error appears in the above-identified patent and that said Letters Patent is hereby corrected as shown below:

At Column 18, Lines 5-6, in Claim 21, delete
"a request to generate markup language", and replace with
--the request to generate markup language--

AND

At Column 18, Lines 26-27, in Claim 24, delete
"initiate a request to generate markup language for a next highest ranked user interface widget", and replace with
--initiate the request to generate markup language for the next highest ranked user interface widget--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*